March 14, 1933.   J. P. MAHONEY   1,901,662
BRAKE
Filed April 27, 1931

INVENTOR.
JOHN P. MAHONEY
BY
ATTORNEY.

Patented Mar. 14, 1933

1,901,662

UNITED STATES PATENT OFFICE

JOHN P. MAHONEY, OF SOUTH BEND, INDIANA, ASSIGNOR TO BENDIX BRAKE COMPANY, OF SOUTH BEND, INDIANA, A CORPORATION OF ILLINOIS

BRAKE

Application filed April 27, 1931. Serial No. 533,237.

This invention relates to brakes, and more particularly to internal expanding brakes.

Broadly, the invention comprehends an operating means including a floating wedge-shaped member movable transversely between the separable ends of a friction element and means for actuating the operating means comprising a bell crank lever extending through an opening in the backing plate and connected at one end to a link engaging the operating means and at its other end to a tension member through which power may be applied.

An object of the invention is to provide an operating means for the friction element of an internal expanding brake which will effectively spread the friction element into drum engagement.

Another object of the invention is to provide a floating actuating member for the friction element of an internal expanding brake and means for actuating the operating member including a bell crank lever having one arm positioned outside of the backing plate and its other arm extending through the backing plate.

A feature of the invention is to provide an operating means for the friction element of an internal expanding brake including a floating wedge-shaped member and means for actuating the member including a bell crank lever having one arm outside of the backing plate and the other arm extending through the backing plate and perpendicular thereto and connected by suitable linkage to the floating wedge-shaped member.

Another feature of the invention is an operating means for spreading the friction element of an internal expanding brake including a bell crank lever extending through an opening in the wall of the backing plate with one arm parallel to the backing plate and its other arm perpendicular to the plate.

The above and other objects and features of the invention including various details of structure and arrangement of parts will be apparent from the following description taken in connection with the drawing forming a part of this specification, and in which.

Figure 1:
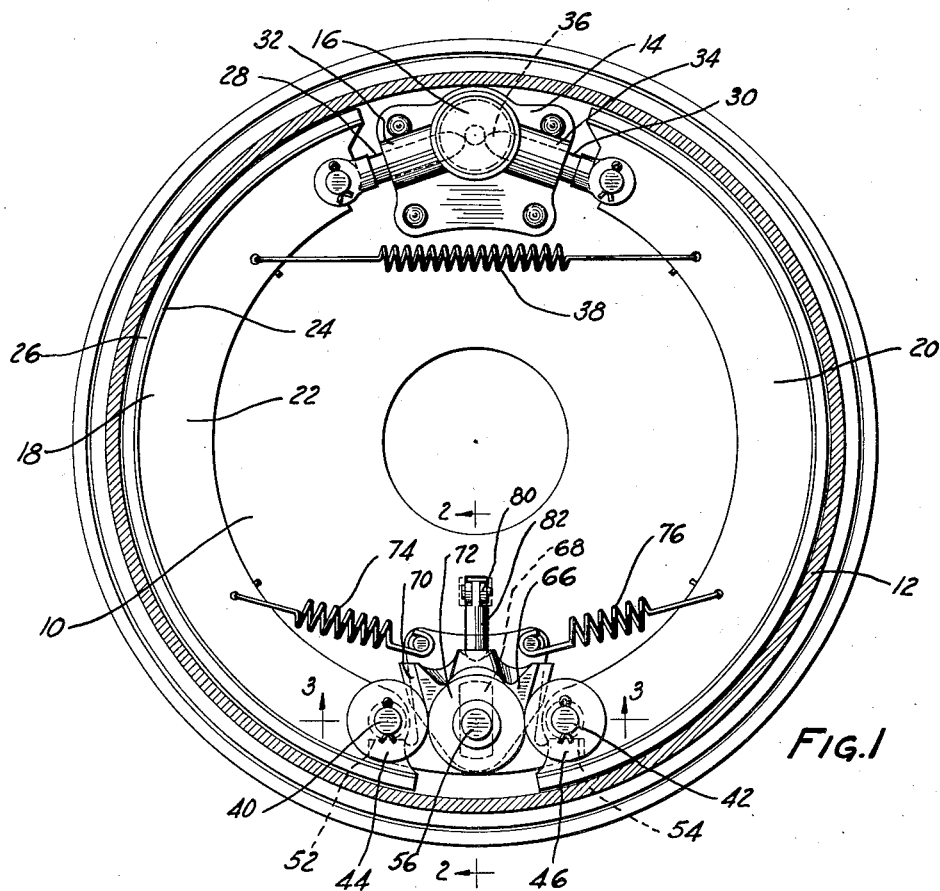
Figure 1 is a vertical sectional view of a brake taken just back of the head of the drum illustrating the friction elements in side elevation and showing the invention as applied.
Figures 2, 3:
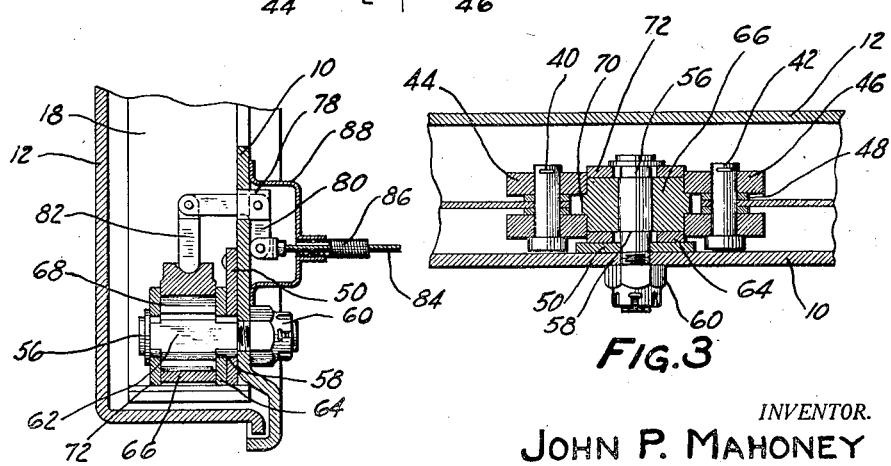
Figure 2 is a sectional view substantially on line 2—2, Figure 1.
Figure 3 is a sectional view substantially on line 3—3, Figure 1.

Referring to the drawing for more specific details of the invention, 10 represents a fixed support such as a backing plate. Associated with the backing plate is a rotatable drum 12 which may be secured to a wheel, not shown. The backing plate has bolted or otherwise secured thereto a bracket 14 supporting an adjusting member 16.

Positioned for movement on the fixed support are interchangeable friction elements or shoes 18 and 20. Each of the shoes includes a web 22 supporting a rim 24 to which is suitably secured a lining 26 adaptable for cooperation with the drum. As shown, the shoes 18 and 20 have pivoted to their articulated ends links 28 and 30. These links extend through suitable sleeves 32 and 34 on the bracket 14 and their ends are pointed as indicated at 36 for engagement with the adjusting member 16.

The links 28 and 30 are normally held in engagement with the adjusting member 16 by a return spring 38 connected between the shoes 18 and 20. The separable ends of the shoes have mounted thereon transverse studs 40 and 42 and positioned for rotation on the studs on opposite sides of the webs or rollers 44 and 46 with suitable spacers 48 interposed between the webs and the rollers.

Suitably secured to the backing plate is a reinforcing plate 50 diametrally disposed with respect to the bracket 14. This plate has shoulders 52 and 54 adapted to engage the heads on the studs 40 and 42 when the brake is in the off position.

A stud 56 is positioned on the backing plate between the separable ends of the friction elements. As shown, this stud has a shoulder 58 seated on the reinforcing plate 50 and a nut 60 is threaded on the stud, so that the stud may be secured in position with the backing plate and reinforcing plate clamped between its shoulder and the nut carried by the stud. This stud has oppositely disposed flats 62. A washer 64 is slipped over the stud and bears against the reinforcing plate, and positioned for movement on the stud is a wedge-shaped floating member 66.

The wedge-shaped floating member has a slot 68, the side walls of which engage the flats 62 on the stud. The member is also provided with ribs 70 which fit snugly between the spaced rollers 44 and 46, and the inclined faces engaging the peripheries of the rollers. The wedge-shaped member 66 is retained on the stud by a washer 72 held in position by shear riveting the free end of the stud.

It will be observed that the washers 64 and 72 engage the peripheries of the rollers when the brake is in the off position and determine the relative position of the friction elements to the braking surface of the drum when the brake is in the off position. The rollers on the friction elements are retained against the washers 64 and 72 by suitable return springs 74 and 76 connected between the shoes and the reinforcing plate 50.

As shown, the backing plate 10 is punched to provide an opening and oppositely disposed lugs 78 flanking the opening. A bell crank lever 80 has one arm extending through the opening and pivoted between the lugs 78. This arm is perpendicular to the backing plate, and pivotally connected to the arm is a link 82 having its free end engaging a recess in the floating wedge-shaped member 66. The other end of the bell crank lever is positioned outside of the brake and parallel to the backing plate and connected to the bell crank lever is a tension member 84 extending through a suitable conduit 86 to a source of power, not shown. The conduit 86 is suitably connected to a casing 88 positioned on the backing plate and adapted to house the lever and its connection with the tension member.

Although this invention has been described in connection with certain specific embodiments, the principles involved are susceptible of numerous other applications that will readily occur to persons skilled in the art. The invention is, therefore, to be limited only as indicated by the scope of the appended claims.

Having thus described the various features of the invention, what I claim as new and desire to secure by Letters Patent is:

1. A brake of the type having a drum and a backing plate at the open side of the drum and shoes within the drum having an operating wedge movable between their ends radially of the drum, and having a conduit fixed at its end to the backing plate and an operating cable extending therethrough and means operated by the cable for operating said wedge.

2. A brake of the type having a drum and a backing plate at the open side of the drum and shoes within the drum having an operating wedge movable between their ends radially of the drum, and having a conduit, a cable extending through the conduit, mechanical means operated by the cable and extending through the backing plate and arranged to operate the wedge, and a housing for said means secured to the backing plate and which is engaged by the end of said conduit.

In testimony whereof, I have hereunto signed my name.

JOHN P. MAHONEY.